(12) United States Patent
Xu et al.

(10) Patent No.: US 9,663,841 B2
(45) Date of Patent: May 30, 2017

(54) SITE CONDITIONS THICK-WALL P92 PIPE LOCAL HEAT TREATMENT METHOD

(71) Applicant: Yingjin Yuan, Tianjin (CN)

(72) Inventors: Lianyong Xu, Tianjin (CN); Hongyang Jing, Tianjin (CN); Yongdian Han, Tianjin (CN); Yi Miao, Tianjin (CN)

(73) Assignee: Tianjin University, Tianjin (CN)

( * ) Notice: Subject to any disclaimer, the term of this patent is extended or adjusted under 35 U.S.C. 154(b) by 55 days.

(21) Appl. No.: 14/376,140

(22) PCT Filed: Oct. 31, 2012

(86) PCT No.: PCT/CN2012/083894
§ 371 (c)(1),
(2) Date: Aug. 1, 2014

(87) PCT Pub. No.: WO2013/143282
PCT Pub. Date: Oct. 3, 2013

(65) Prior Publication Data
US 2015/0122376 A1    May 7, 2015

(30) Foreign Application Priority Data
Mar. 27, 2012    (CN) .......................... 2012 1 0084750

(51) Int. Cl.
*C21D 9/50* (2006.01)
*C21D 1/40* (2006.01)
(Continued)

(52) U.S. Cl.
CPC .............. *C21D 9/50* (2013.01); *B23K 31/027* (2013.01); *C21D 1/30* (2013.01); *C21D 1/34* (2013.01);
(Continued)

(58) Field of Classification Search
CPC ... C21D 9/50; C21D 1/30; C21D 1/34; C21D 1/40; C21D 2221/00; C21D 9/08;
(Continued)

(56) References Cited

FOREIGN PATENT DOCUMENTS

| CN | 1935438 A | 3/2007 |
|---|---|---|
| CN | 101724740 A | 6/2010 |

(Continued)

OTHER PUBLICATIONS

Criteria for Heated Band Width Based on Through-thickness Temperature Distribution by Hao Lu Journal of Japan Welding Society, vol. 19, No. 3 pp. 416-423 (2001).*

(Continued)

*Primary Examiner* — Jessee Roe
*Assistant Examiner* — Jenny Wu
(74) *Attorney, Agent, or Firm* — Bei & Ocean; George G. Wang

(57) ABSTRACT

The present invention published a large walled field conditions P92 long pipeline local heat treatment processes. Firstly, according to the specific conditions for the on-site grade heat-resistant steel (P92 pipe), combining of the finite element method and test, the Heated Band (HB) width and Gradient Control Band (GCB) was calculated. The pipe was then locally heated using the flexible ceramic resistive heater. When the temperature reaches 80-100° C., the pipe was heated to constant temperature at 80-100° C. for 2 h. The pipe was heated to 300° C. at the rate of 150° C./h. When the temperature reaches 300° C., rising the temperature to 765° C. at the rate of 80° C./h. Holding time is calculated by the wall thickness (5 min/mm, no less than 4 h). Lowering the temperature to 300° C. at the rate of 100° C./h and then natural cooling to room temperature, finally removing the heating device. Finally, the local heat treatment process can be obtained. The present invention can (Continued)

Figure 1:
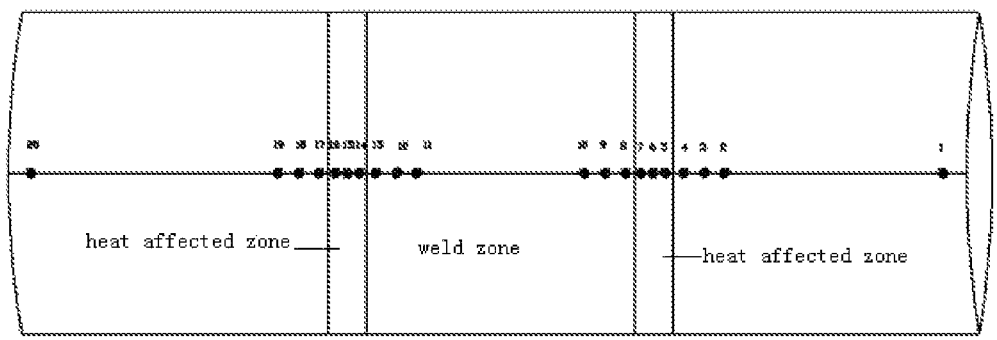

effectively decrease the temperature difference between the outer and inner wall, the residual stress in the welded joints. Thus the service properties can be guaranteed.

3 Claims, 3 Drawing Sheets

(51) Int. Cl.
*H05B 3/14* (2006.01)
*C21D 9/08* (2006.01)
*C21D 9/14* (2006.01)
*C21D 1/30* (2006.01)
*C21D 1/34* (2006.01)
*B23K 31/02* (2006.01)
*H05B 3/34* (2006.01)
*B23K 101/06* (2006.01)
*B23K 101/10* (2006.01)
*B23K 103/04* (2006.01)

(52) U.S. Cl.
CPC ............... *C21D 1/40* (2013.01); *C21D 9/08* (2013.01); *C21D 9/14* (2013.01); *H05B 3/141* (2013.01); *H05B 3/34* (2013.01); *B23K 2201/06* (2013.01); *B23K 2201/10* (2013.01); *B23K 2203/04* (2013.01); *C21D 2221/00* (2013.01); *Y02B 30/26* (2013.01)

(58) Field of Classification Search
CPC .. C21D 9/14; B23K 2201/06; B23K 2201/10; B23K 2203/04; B23K 31/027; H05B 3/141; H05B 3/34; Y02B 30/26
See application file for complete search history.

(56) References Cited

FOREIGN PATENT DOCUMENTS

| | | |
|---|---|---|
| CN | 102605158 A | 7/2012 |
| RU | 2034050 C1 | 4/1995 |

OTHER PUBLICATIONS

Gao, Jiean et al., Experiment on Welding Heat Treatment Technique for SA 335-P92 Steel Tube by induction Heating, <Electronic Power Construction>, Oct. 2010, p. 109-113, vol. 31, No. 10.
Bao, Zhenhui et al., P92 and P122 Steel on-site Weld and Heat Treatment Technology in Huaneng Yuhuan Power Plant Project, <Electronic Power Construction>, Apr. 2007, p. 70-72, vol. 28, No. 4.
Zhou, Yebin et al., Engineering Application of welding and heat treatment for large caliber thick-wall P92 pipeline, <Machinist Metal Forming>, 2011, No. 4.
Zhou, Yebin et al., Comparison and discussion of different on-site heat treatments for large caliber thick-wall P92 pipeline, <Welding Technology>, Sep. 2011, p. 8-13, vol. 40 supplement.
Xu, Lianyong et al., Influence of heat treatment on residual stress of P92 streel pipe girth weld, <Transactions of the China Welding Institution>, Mar. 2010, p. 13-17, vol. 31, No. 3.
Li, Jianlong et al., Process application of P92 steel welding and heat treatment, <Machinist Metal Forming>, 2010, No. 24.

* cited by examiner

SITE CONDITIONS THICK-WALL P92 PIPE LOCAL HEAT TREATMENT METHOD

TECHNICAL FIELD

The present invention relates to a high-grade heat-resistant steels local heat treatment process, particularly, it relates to a large walled field conditions P92 long pipeline local heat treatment processes.

BACKGROUND ART

Currently, the electricity industry is facing unprecedented challenges. To accelerate the pace of development of electric power, it is faced with the power to accelerate the pace of structural adjustment. The most realistic and feasible way is to accelerate the construction of ultra-supercritical units. Supercritical pressure parameter is the effective use of thermal energy in a new technology. Through its steam pressure and temperature increased to some extent, to improve the thermal efficiency of the unit. To ensure that the unit at a higher temperature and pressure stable operation, it is necessary to use a higher temperature strength of steel, or the wall thickness of the member must be increased exponentially to meet service requirements. Currently the temperature of P92 steel used in the boiler main steam was raised to 610° C., reheat temperatures up to 625° C. P92 steel has been widely used in the USC units set box and main steam piping and other components. P92 steel was used widely in China without of foreign experience.

On economic and technological grounds, P92 pipes are usually fabricated from separate pieces by welding girth joints. However, after welding process the joints are marked by residual welding stress and nonuniform microstructures and properties, which will impair the operational reliability of components. Hence, PWHT should be instantly carried out. For large-sized vessels and apparatuses, placing the entire component in a furnace or oven is impractical. In such case, the weld metal, heat-affected zone (HAZ), and a limited volume of base metal adjacent to the weld might be subjected to heating using the local heat treatment (LHT) technology. Compared with the overall heat treatment, it saves fuel and material resources substantially. The primary benefit of local PWHT is relaxation of residual stresses. Other significant benefits are reducing susceptibility to brittle fracture and improving notch toughness of welded joints. Heated band consists of the soak band plus adjacent base metal over which the heat source is applied to. Because of the inherent radial temperature gradient, the band should be large enough to achieve the required temperature and limit the induced stresses within the soak band. ASME Boiler and Pressure Vessel Code, Rules for Construction of Pressure Vessels: Alternative Rules, Section VIII, Division 2 As a minimum, the soak band shall contain the weld, heat affected zone, and a portion of base metal adjacent to the weld being heat treated. The minimum width of this volume is the widest width of weld plus the nominal thickness defined in paragraph 6.4.2.7 or 50 mm (2 in.), whichever is less, on each side or end of the weld. The equation of Heated Band (HB) width and Gradient Control Band (GCB) width has not provided. In summary, various standards or codes have different methods to define the HB width and GCB width. Hence it may bring confusion in engineering practice.

Results of the literature search indicate that no study has been conducted to take the field conditions during local PWHT of P92 welded joints into consideration. Under field conditions, effect of local PWHT may be influenced by air convection situation, material types, insulation condition, et al. and determination of the local PWHT criterion for ASME P92 pipes becomes a more complicated problem.

Currently many welding joints cracks of P92 pipe was observed in many service after LHT. It should be inappropriate for local heat treatment process. Therefore, it is significant to choose the right LHT technology for the protection of local heat treatment P92 safe operation of pipelines.

SUMMARY OF THE INVENTION

The object of the present invention is to overcome the deficiencies of the prior art. According to the specific conditions for the on-site grade heat-resistant steel (P92 pipe), combining of the finite element method and test, a local heat treatment process was obtained. Using this process, temperature difference between the inside and outside wall temperature process is within 25° C. or less. And residual stress relieving after heat treatment was good.

Technical object of the invention is realized by the following technical solutions Site conditions walled pipe P92 local heat treatment method was implemented, according to the following steps Step 1, Calculating the Heated Band (HB) width and Gradient Control Band (GCB)

$$HB=15.6\times\sqrt{Rt}-3.556\times R-372$$

Where R is pipe inside radius, t is pipe wall thickness $$GCB=1.4\times HB+226$$

Step 2, In accordance with the P92 steel pipe welding process for welding.

Step 3, after welding, when the P92 pipe was cool down to 120-150° C. using the calculation results in Step 1 the respective heating device, insulation device were installed outside P92 pipes and the thermocouple was arranged. When the temperature reaches 80-100° C., the pipe was heated to constant temperature at 80-100° C. for 2 h.

Step 4, the pipe was heated to 300° C. at the rate of 150° C./h. When the temperature reaches 300° C., rising the temperature to 765° C. at the rate of 80° C./h. Holding time is calculated by the wall thickness (5 min/mm, no less than 4 h)

Step 5, lowering the temperature to 300° C. at the rate of 100° C./h and then natural cooling to room temperature, finally removing the heating device.

In the technical solution of the present invention, the flexible ceramic resistive heater (e.g. WDK-6360 type flexible ceramic resistance heater) was used to heat the steel pipe, and a thermocouple temperature, cotton insulation and a resistance heater were used to control the heating rate and cooling speed control, in order to meet the needs of the heat treatment method.

After P92 pipe on site welding, the X-ray method was employed to measure the residual stress at different distances from the center of weld. After the completion of local heat treatment, re-use the same approach to test the residual stress; contrast between the two can be analyzed to obtain the effect of local heat treatment on residual stress.

During monitoring of the temperature, three temperature zones are set in the invention: 1#, 2#, 3# are the thermocouples for temperature controlling locating at 1 o'clock, 11 o'clock, 6 o'clock of the center of the inner weld. Others are thermocouples for monitoring. Among them, 5# (12 o'clock) locates at the center of the outer weld. The distance between 9#, 11#, 13#, 15# thermocouples (12 o'clock) and weld edge was 50 mm, 1.5t, 2t, 3t respectively (t was the pipe thickness). The distance between 10#, 12#, 14#, 16# thermocouples (6 o'clock) and weld edge was t, 1.5t, 2t, 3t respectively. 6#, 17#, 19# thermocouples locate at 12 o'clock of inner wall corresponding with 5#, 9#和 13# thermocouples at the outer wall. 4#, 18#, 20# thermocouples locate at 6 o'clock of inner wall corresponding with 3#, 10# 和 14# thermocouples at the outer wall. The monitoring thermocouples mentioned above were used to measure the temperature during the heat treatment in the axial direction gradient.

The invention relates to the field conditions presents a thick-walled pipe P92 local heat treatment method to achieve better results. To this end, the method using experimental and numerical simulation method, a topical heat treatment process for thick-walled pipes P92 under scene conditions has been obtained, ie how to determine the HB and GCB using the pipe diameter and wall thickness and get a good effect of heat treatment (better temperature distribution and elimination of residual stress effects). Compared with the prior art, the present invention can achieve an effective reduction PWHT P92 pipe's outer wall during constant temperature (less than 25° C.) and heat treatment of the residual stress of the welded joint, to ensure the use of materials properties; Additionally, the method belong to different thickness and diameter specifications of the general specification, expanding the scope of application of local heat treatment process.

BRIEF DESCRIPTION OF THE INVENTION

FIG. 1 The stress measuring points specimen diagram. The test point interval in the weld zone is 3 mm (the 3 points near heat affected zone), in the heat affected zone is 1.5 mm, in the base material is 3 mm spacing for the first 3 points (close to the heat-affected zone three points), the outermost is 50 mm from a fusion line.

Figure 2:
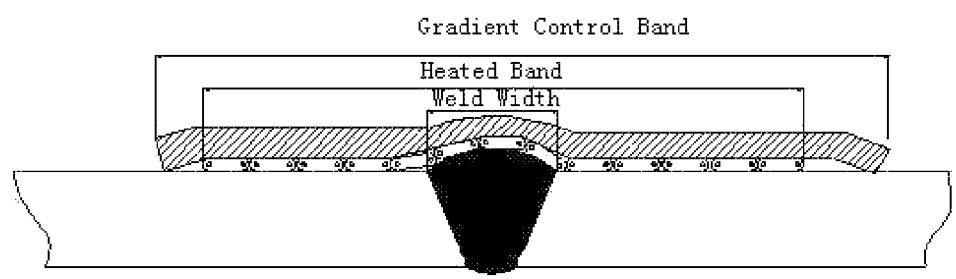

FIG. 2 Heating band and the insulation layer arrangement

Figure 3:
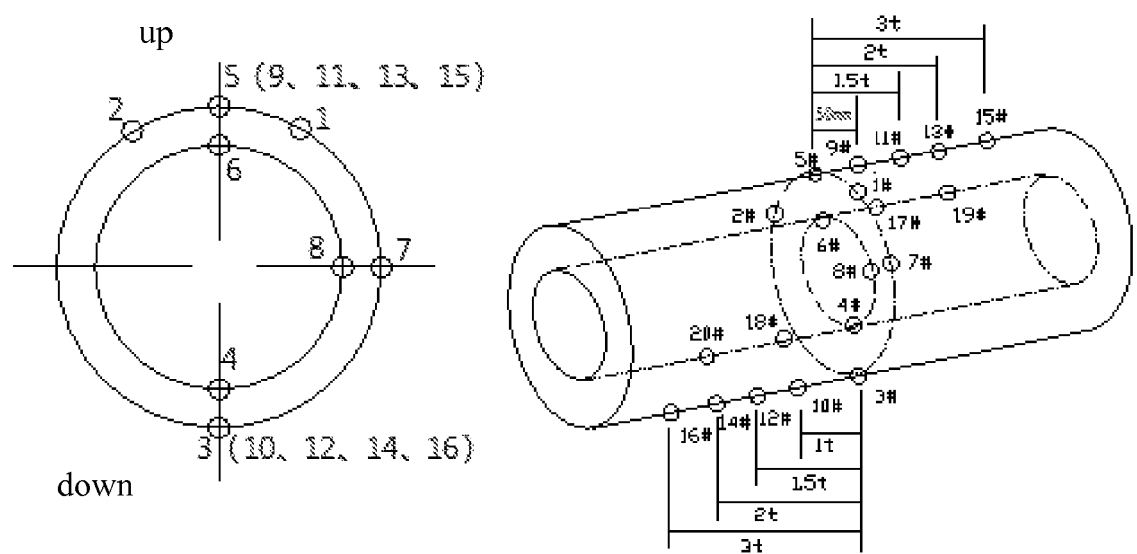

FIG. 3 Thermocouple installation location and distribution diagram. 1#, 2#, 3# are the thermocouples for temperature controlling locating at 1 o'clock, 11 o'clock, 6 o'clock of the center of the inner weld. Others are thermocouples for monitoring. Among them, 5# (12 o'clock) locates at the center of the outer weld. The distance between 9#, 11#, 13#, 15# thermocouples (12 o'clock) and weld edge was 50 mm, 1.5t, 2t, 3t respectively (t was the pipe thickness). The distance between 10#, 12#, 14#, 16# thermocouples (6 o'clock) and weld edge was t, 1.5t, 2t, 3t respectively. 6#, 17#, 19# thermocouples locate at 12 o'clock of inner wall corresponding with 5#, 9#和 13# thermocouples at the outer wall. 4#, 18#, 20# thermocouples locate at 6 o'clock of inner wall corresponding with 3#, 10# 和 14# thermocouples at the outer wall.

SPECIFIC EMBODIMENTS

Below with reference to specific embodiments described in more detail the technical solution of the present invention, in embodiments of the present application carried out under the premise, gives a detailed embodiments and procedures, the protection scope of the present invention is not limited to the following embodiments case.

EXAMPLE 1

First of all, the P92 pipes with inner diameter of 538 mm and thickness of 94.5 mm were welded according to the welding procedure. Before welding, the monitoring thermocouples was install at the inner wall of the pipe.

The HB and GCB were calculated (HB=1230 mm, GCB=1950 mm). Then the Heater and insulation cotton Specifications were customized. WDK-6360-type flexible ceramic resistance heater was chosen.

The X-ray method was employed to measure the residual stress at different distances from the center of weld. The test point interval in the weld zone is 3 mm (the 3 points near heat affected zone), in the heat affected zone is 1.5 mm, in the base material is 3 mm spacing for the first 3 points (close to the heat-affected zone three points), the outermost is 50 mm from a fusion line (See FIG. 1).

After welding, the residual stress measurement was conducted. According to the diagram shown in FIG. 2, the heating and heat-retaining devices were installed to confirm the GCB and HB. During monitoring of the temperature, three temperature zones are set in the invention: 1#, 2#, 3# are the thermocouples for temperature controlling locating at 1 o'clock, 11 o'clock, 6 o'clock of the center of the inner weld. Others are thermocouples for monitoring. Among them, 5# (12 o'clock) locates at the center of the outer weld. The distance between 9#, 11#, 13#, 15# thermocouples (12 o'clock) and weld edge was 50 mm, 1.5t, 2t, 3t respectively (t was the pipe thickness). The distance between 10#, 12#, 14#, 16# thermocouples (6 o'clock) and weld edge was t, 1.5t, 2t, 3t respectively. 6#, 17#, 19# thermocouples locate at 12 o'clock of inner wall corresponding with 5#, 9#和 13# thermocouples at the outer wall. 4#, 18#, 20# thermocouples locate at 6 o'clock of inner wall corresponding with 3#, 10# 和 14# thermocouples at the outer wall. The monitoring thermocouples mentioned above were used to measure the temperature during the heat treatment in the axial direction gradient (See FIG. 3).

Then the local heat treatment process was conducted on the welded pipe. After welding, when the P92 pipe was cool down to 120-150° C., the respective heating device, insulation device were installed outside P92 pipes and the thermocouple was arranged. When the temperature reaches 80-100° C., the pipe was heated to constant temperature at 80-100° C. for 2 h.

The pipe was heated to 300° C. at the rate of 150° C./h. When the temperature reaches 300° C., rising the temperature to 765° C. at the rate of 80° C./h. Holding time is calculated by the wall thickness (5 min/mm, no less than 4 h).

Lowering the temperature to 300° C. at the rate of 100° C./h and then natural cooling to room temperature, finally removing the heating device.

After local heat treatment, the residual stress measurement was conducted using X-ray method (iXRD Portable residual stress measuring instrument).

Measuring temperature difference at different distances from the weld during the constant temperature between the inner wall (12 o'clock position), the results are shown as follows

| Time | Error between average temperature zone (50 mm from weld edge) and inner weld (° C.) | | |
|---|---|---|---|
| | Outer wall #9 | Inner wall#17 | Temperature Difference |
| 765° C.*1 h | 748 | 733 | 15 |
| 765° C.*2 h | 752 | 735 | 17 |
| 765° C.*3 h | 754 | 740 | 14 |
| 765° C.*4 h | 755 | 742 | 13 |
| 765° C.*5 h | 755 | 743 | 12 |

-continued

| | Error between average temperature zone (50 mm from weld edge) and inner weld (° C.) | | |
|---|---|---|---|
| Time | Outer wall #9 | Inner wall#17 | Temperature Difference |
| 765° C.*6 h | 756 | 745 | 11 |
| 765° C.*7 h | 755 | 744 | 11 |
| 765° C.*8 h | 755 | 745 | 10 |

The residual stress before and after local heat treatment was measured and the results were shown as follows.

| | | Before LHT | | After LHT | |
|---|---|---|---|---|---|
| Location | No. | X (Axial) | Y (Circumferential) | X (Axial) | Y (Circumferential) |
| Base metal | 20 | 112 | 76 | 74 | 13 |
| | 19 | 198 | 191 | 79 | 10 |
| | 18 | 158 | 200 | 75 | 20 |
| | 17 | 108 | 188 | 14 | 11 |
| HAZ | 16 | 168 | 200 | 36 | 47 |
| | 15 | 139 | 105 | −36 | −14 |
| | 14 | 171 | 119 | 20 | −5 |
| Weld metal | 13 | 145 | 99 | 51 | 18 |
| | 12 | 118 | 188 | 107 | 23 |
| | 11 | 139 | 80 | 113 | 76 |
| | 10 | 125 | 103 | 118 | 98 |
| | 9 | 117 | 146 | 44 | 84 |
| | 8 | 114 | 96 | 43 | 39 |
| HAZ | 7 | 125 | 74 | 61 | 57 |
| | 6 | 129 | 146 | 72 | 41 |
| | 5 | 134 | 187 | 80 | 18 |
| Base Metal | 4 | 253 | 179 | 37 | 35 |
| | 3 | 239 | 164 | 65 | 55 |
| | 2 | 200 | 124 | 87 | 68 |
| | 1 | 144 | 77 | 62 | 5 |

EXAMPLE 2

First of all, the P92 pipes with inner diameter of 538 mm and thickness of 91 mm were welded according to the welding procedure. Before welding, the monitoring thermcouples was install at the inner wall of the pipe.

The HB and GCB were calculated (HB=1167 mm, GCB=1859 mm). Then the Heater and insulation cotton Specifications were customized. WDK-6360-type flexible ceramic resistance heater was chosen.

The X-ray method was employed to measure the residual stress at different distances from the center of weld. The test point interval in the weld zone is 3 mm (the 3 points near heat affected zone), in the heat affected zone is 1.5 mm, in the base material is 3 mm spacing for the first 3 points (close to the heat-affected zone three points), the outermost is 50 mm from a fusion line (See FIG. 1).

After welding, the residual stress measurement was conducted. According to the diagram shown in FIG. 2, the heating and heat-retaining devices were installed to confirm the GCB and HB. During monitoring of the temperature, three temperature zones are set in the invention: 1#, 2#, 3# are the thermocouples for temperature controlling locating at 1 o'clock, 11 o'clock, 6 o'clock of the center of the inner weld. Others are thermocouples for monitoring. Among them, 5# (12 o'clock) locates at the center of the outer weld. The distance between 9#, 11#, 13#, 15# thermocouples (12 o'clock) and weld edge was 50 mm, 1.5t, 2t, 3t respectively (t was the pipe thickness). The distance between 10#, 12#, 14#, 16# thermocouples (6 o'clock) and weld edge was t, 1.5t, 2t, 3t respectively. 6#, 17#, 19# thermocouples locate at 12 o'clock of inner wall corresponding with 5#, 9#和 13# thermocouples at the outer wall. 4#, 18#, 20# thermocouples locate at 6 o'clock of inner wall corresponding with 3#, 10# 和 14# thermocouples at the outer wall. The monitoring thermocouples mentioned above were used to measure the temperature during the heat treatment in the axial direction gradient (See FIG. 3).

Then the local heat treatment process was conducted on the welded pipe. After welding, when the P92 pipe was cool down to 120-150° C., the respective heating device, insulation device were installed outside P92 pipes and the thermocouple was arranged. When the temperature reaches 80-100° C., the pipe was heated to constant temperature at 80-100° C. for 2 h.

The pipe was heated to 300° C. at the rate of 150° C./h. When the temperature reaches 300° C., rising the temperature to 765° C. at the rate of 80° C./h. Holding time is calculated by the wall thickness (5 min/mm, no less than 4 h).

Lowering the temperature to 300° C. at the rate of 100° C./h and then natural cooling to room temperature, finally removing the heating device.

After local heat treatment, the residual stress measurement was conducted using X-ray method (iXRD Portable residual stress measuring instrument).

Measuring temperature difference at different distances from the weld during the constant temperature between the inner wall (12 o'clock position), the results are shown as follows

| | Error between average temperature zone (50 mm from weld edge) and inner weld (° C.) | | |
|---|---|---|---|
| Time | Outer wall #9 | Inner wall#17 | Temperature Difference |
| 765° C.*1 h | 748 | 735 | 13 |
| 765° C.*2 h | 752 | 740 | 12 |
| 765° C.*3 h | 754 | 741 | 13 |
| 765° C.*4 h | 755 | 745 | 10 |
| 765° C.*5 h | 755 | 748 | 7 |
| 765° C.*6 h | 756 | 743 | 13 |
| 765° C.*7 h | 755 | 746 | 9 |
| 765° C.*8 h | 755 | 747 | 8 |

The residual stress before and after local heat treatment was measured and the results were shown as follows.

| | | Before LHT | | After LHT | |
|---|---|---|---|---|---|
| Location | No. | X (Axial) | Y (Circumferential) | X (Axial) | Y (Circumferential) |
| Base metal | 20 | 124 | 83 | 70 | 51 |
| | 19 | 158 | 185 | 78 | 79 |
| | 18 | 148 | 186 | 73 | 142 |
| | 17 | 109 | 193 | 57 | 111 |
| HAZ | 16 | 151 | 208 | 52 | 147 |
| | 15 | 179 | 114 | 82 | 82 |
| | 14 | 173 | 123 | 71 | 95 |
| Weld metal | 13 | 155 | 142 | 78 | 118 |
| | 12 | 127 | 152 | 100 | 120 |
| | 11 | 135 | 112 | 103 | 76 |
| | 10 | 129 | 99 | 108 | 85 |
| | 9 | 124 | 141 | 75 | 80 |
| | 8 | 124 | 107 | 59 | 78 |
| HAZ | 7 | 127 | 86 | 78 | 51 |
| | 6 | 120 | 149 | 75 | 102 |
| | 5 | 139 | 179 | 81 | 140 |

-continued

| Location | No. | Before LHT | | After LHT | |
|---|---|---|---|---|---|
| | | X (Axial) | Y (Circumferential) | X (Axial) | Y (Circumferential) |
| Base Metal | 4 | 199 | 174 | 51 | 135 |
| | 3 | 189 | 173 | 79 | 59 |
| | 2 | 207 | 139 | 80 | 76 |
| | 1 | 157 | 97 | 90 | 40 |

EXAMPLE 3

First of all, the P92 pipes with inner diameter of 550 mm and thickness of 80 mm were welded according to the welding procedure. Before welding, the monitoring thermcouples was install at the inner wall of the pipe.

The HB and GCB were calculated (HB=944 mm, GCB=1548 mm). Then the Heater and insulation cotton Specifications were customized. WDK-6360-type flexible ceramic resistance heater was chosen.

The X-ray method was employed to measure the residual stress at different distances from the center of weld. The test point interval in the weld zone is 3 mm (the 3 points near heat affected zone), in the heat affected zone is 1.5 mm, in the base material is 3 mm spacing for the first 3 points (close to the heat-affected zone three points), the outermost is 50 mm from a fusion line (See FIG. 1).

After welding, the residual stress measurement was conducted. According to the diagram shown in FIG. 2, the heating and heat-retaining devices were installed to confirm the GCB and HB. During monitoring of the temperature, three temperature zones are set in the invention: 1#, 2#, 3# are the thermocouples for temperature controlling locating at 1 o'clock, 11 o'clock, 6 o'clock of the center of the inner weld. Others are thermocouples for monitoring. Among them, 5# (12 o'clock) locates at the center of the outer weld. The distance between 9#, 11#, 13#, 15# thermocouples (12 o'clock) and weld edge was 50 mm, 1.5t, 2t, 3t respectively (t was the pipe thickness). The distance between 10#, 12#, 14#, 16# thermocouples (6 o'clock) and weld edge was t, 1.5t, 2t, 3t respectively. 6#, 17#, 19# thermocouples locate at 12 o'clock of inner wall corresponding with 5#, 9#和 13# thermocouples at the outer wall. 4#, 18#, 20# thermocouples locate at 6 o'clock of inner wall corresponding with 3#, 10# 和 14# thermocouples at the outer wall. The monitoring thermocouples mentioned above were used to measure the temperature during the heat treatment in the axial direction gradient (See FIG. 3).

Then the local heat treatment process was conducted on the welded pipe. After welding, when the P92 pipe was cool down to 120-150° C., the respective heating device, insulation device were installed outside P92 pipes and the thermocouple was arranged. When the temperature reaches 80-100° C., the pipe was heated to constant temperature at 80-100° C. for 2 h.

The pipe was heated to 300° C. at the rate of 150° C./h. When the temperature reaches 300° C., rising the temperature to 765° C. at the rate of 80° C./h. Holding time is calculated by the wall thickness (5 min/mm, no less than 4 h).

Lowering the temperature to 300° C. at the rate of 100° C./h and then natural cooling to room temperature, finally removing the heating device.

After local heat treatment, the residual stress measurement was conducted using X-ray method (iXRD Portable residual stress measuring instrument).

Measuring temperature difference at different distances from the weld during the constant temperature between the inner wall (12 o'clock position), the results are shown as follows

| | Error between average temperature zone (50 mm from weld edge) and inner weld (° C.) | | |
|---|---|---|---|
| Time | Outer wall #9 | Inner wall #17 | Temperature difference |
| 765° C.*1 h | 747 | 737 | 10 |
| 765° C.*2 h | 751 | 741 | 10 |
| 765° C.*3 h | 755 | 743 | 12 |
| 765° C.*4 h | 754 | 745 | 9 |
| 765° C.*5 h | 754 | 747 | 7 |
| 765° C.*6 h | 754 | 744 | 10 |
| 765° C.*7 h | 755 | 748 | 7 |
| 765° C.*8 h | 755 | 745 | 10 |

The residual stress before and after local heat treatment was measured and the results were shown as follows.

| Location | No. | Before LHT | | After LHT | |
|---|---|---|---|---|---|
| | | X (Axial) | Y (Circumferential) | X (Axial) | Y (Circumferential) |
| Base metal | 20 | 134 | 99 | 78 | 58 |
| | 19 | 160 | 188 | 89 | 91 |
| | 18 | 149 | 178 | 78 | 120 |
| | 17 | 114 | 181 | 81 | 109 |
| HAZ | 16 | 147 | 204 | 64 | 149 |
| | 15 | 165 | 123 | 93 | 91 |
| | 14 | 178 | 129 | 99 | 115 |
| Weld metal | 13 | 159 | 131 | 85 | 110 |
| | 12 | 134 | 140 | 107 | 104 |
| | 11 | 139 | 109 | 91 | 79 |
| | 10 | 139 | 103 | 113 | 71 |
| | 9 | 207 | 138 | 114 | 83 |
| | 8 | 139 | 108 | 70 | 79 |
| HAZ | 7 | 145 | 79 | 72 | 41 |
| | 6 | 137 | 145 | 78 | 110 |
| | 5 | 141 | 171 | 89 | 132 |
| Base Metal | 4 | 179 | 140 | 57 | 137 |
| | 3 | 193 | 157 | 74 | 78 |
| | 2 | 205 | 131 | 88 | 81 |
| | 1 | 167 | 106 | 95 | 53 |

EXAMPLE 4

First of all, the P92 pipes with inner diameter of 433 mm and thickness of 72 mm were welded according to the welding procedure. Before welding, the monitoring thermcouples was install at the inner wall of the pipe.

The HB and GCB were calculated (HB=843 mm, GCB=1406 mm). Then the Heater and insulation cotton Specifications were customized. WDK-6360-type flexible ceramic resistance heater was chosen.

The X-ray method was employed to measure the residual stress at different distances from the center of weld. The test point interval in the weld zone is 3 mm (the 3 points near heat affected zone), in the heat affected zone is 1.5 mm, in the base material is 3 mm spacing for the first 3 points (close to the heat-affected zone three points), the outermost is 50 mm from a fusion line (See FIG. 1).

After welding, the residual stress measurement was conducted. According to the diagram shown in FIG. 2, the heating and heat-retaining devices were installed to confirm the GCB and HB. During monitoring of the temperature, three temperature zones are set in the invention: 1#, 2#, 3# are the thermocouples for temperature controlling locating at 1 o'clock, 11 o'clock, 6 o'clock of the center of the inner weld. Others are thermocouples for monitoring. Among them, 5# (12 o'clock) locates at the center of the outer weld. The distance between 9#, 11#, 13#, 15# thermocouples (12 o'clock) and weld edge was 50 mm, 1.5t, 2t, 3t respectively (t was the pipe thickness). The distance between 10#, 12#, 14#, 16# thermocouples (6 o'clock) and weld edge was t, 1.5t, 2t, 3t respectively. 6#, 17#, 19# thermocouples locate at 12 o'clock of inner wall corresponding with 5#, 9# 和 13# thermocouples at the outer wall. 4#, 18#, 20# thermocouples locate at 6 o'clock of inner wall corresponding with 3#, 10# 和 14# thermocouples at the outer wall. The monitoring thermocouples mentioned above were used to measure the temperature during the heat treatment in the axial direction gradient (See FIG. 3).

Then the local heat treatment process was conducted on the welded pipe. After welding, when the P92 pipe was cool down to 120-150° C., the respective heating device, insulation device were installed outside P92 pipes and the thermocouple was arranged. When the temperature reaches 80-100° C., the pipe was heated to constant temperature at 80-100° C. for 2 h.

The pipe was heated to 300° C. at the rate of 150° C./h. When the temperature reaches 300° C., rising the temperature to 765° C. at the rate of 80° C./h. Holding time is calculated by the wall thickness (5 min/mm, no less than 4 h).

Lowering the temperature to 300° C. at the rate of 100° C./h and then natural cooling to room temperature, finally removing the heating device.

After local heat treatment, the residual stress measurement was conducted using X-ray method (iXRD Portable residual stress measuring instrument).

Measuring temperature difference at different distances from the weld during the constant temperature between the inner wall (12 o'clock position), the results are shown as follows

| Time | Error between average temperature zone (50 mm from weld edge) and inner weld (° C.) | | |
|---|---|---|---|
| | Outer wall #9 | Inner wall #17 | Temperature difference |
| 765° C.*1 h | 745 | 738 | 7 |
| 765° C.*2 h | 750 | 740 | 10 |
| 765° C.*3 h | 755 | 741 | 14 |
| 765° C.*4 h | 753 | 741 | 12 |
| 765° C.*5 h | 755 | 745 | 10 |
| 765° C.*6 h | 754 | 747 | 7 |
| 765° C.*7 h | 753 | 748 | 5 |
| 765° C.*8 h | 755 | 747 | 8 |

The residual stress before and after local heat treatment was measured and the results were shown as follows.

| | | Before LHT | | After LHT | |
|---|---|---|---|---|---|
| Location | No. | X (Axial) | Y (Circumferential) | X (Axial) | Y (Circumferential) |
| Base metal | 20 | 132 | 91 | 84 | 58 |
| | 19 | 164 | 171 | 92 | 91 |
| | 18 | 147 | 171 | 81 | 120 |
| | 17 | 118 | 172 | 78 | 114 |
| HAZ | 16 | 149 | 199 | 69 | 102 |
| | 15 | 164 | 134 | 98 | 97 |
| | 14 | 170 | 131 | 91 | 101 |
| Weld metal | 13 | 160 | 138 | 88 | 95 |
| | 12 | 139 | 142 | 101 | 93 |
| | 11 | 141 | 110 | 97 | 89 |
| | 10 | 147 | 117 | 115 | 84 |
| | 9 | 199 | 134 | 119 | 89 |
| | 8 | 140 | 119 | 79 | 78 |
| HAZ | 7 | 149 | 88 | 77 | 59 |
| | 6 | 143 | 114 | 83 | 78 |
| | 5 | 169 | 165 | 92 | 102 |
| Base Metal | 4 | 185 | 107 | 61 | 80 |
| | 3 | 179 | 151 | 78 | 90 |
| | 2 | 189 | 134 | 80 | 89 |
| | 1 | 165 | 110 | 97 | 76 |

EXAMPLE 5

First of all, the P92 pipes with inner diameter of 355 mm and thickness of 42 mm were welded according to the welding procedure. Before welding, the monitoring thermcouples was install at the inner wall of the pipe.

The HB and GCB were calculated (HB=270 mm, GCB=605 mm). Then the Heater and insulation cotton Specifications were customized. WDK-6360-type flexible ceramic resistance heater was chosen.

The X-ray method was employed to measure the residual stress at different distances from the center of weld. The test point interval in the weld zone is 3 mm (the 3 points near heat affected zone), in the heat affected zone is 1.5 mm, in the base material is 3 mm spacing for the first 3 points (close to the heat-affected zone three points), the outermost is 50 mm from a fusion line (See FIG. 1).

After welding, the residual stress measurement was conducted. According to the diagram shown in FIG. 2, the heating and heat-retaining devices were installed to confirm the GCB and HB. During monitoring of the temperature, three temperature zones are set in the invention: 1#, 2#, 3# are the thermocouples for temperature controlling locating at 1 o'clock, 11 o'clock, 6 o'clock of the center of the inner weld. Others are thermocouples for monitoring. Among them, 5# (12 o'clock) locates at the center of the outer weld. The distance between 9#, 11#, 13#, 15# thermocouples (12 o'clock) and weld edge was 50 mm, 1.5t, 2t, 3t respectively (t was the pipe thickness). The distance between 10#, 12#, 14#, 16# thermocouples (6 o'clock) and weld edge was t, 1.5t, 2t, 3t respectively. 6#, 17#, 19# thermocouples locate at 12 o'clock of inner wall corresponding with 5#, 9# 和 13# thermocouples at the outer wall. 4#, 18#, 20# thermocouples locate at 6 o'clock of inner wall corresponding with 3#, 10# 和 14# thermocouples at the outer wall. The monitoring thermocouples mentioned above were used to measure the temperature during the heat treatment in the axial direction gradient (See FIG. 3).

Then the local heat treatment process was conducted on the welded pipe. After welding, when the P92 pipe was cool down to 120-150° C., the respective heating device, insulation device were installed outside P92 pipes and the thermocouple was arranged. When the temperature reaches 80-100° C., the pipe was heated to constant temperature at 80-100° C. for 2 h.

The pipe was heated to 300° C. at the rate of 150° C./h. When the temperature reaches 300° C., rising the temperature to 765° C. at the rate of 80° C./h. Holding time is calculated by the wall thickness (5 min/mm, no less than 4 h).

Lowering the temperature to 300° C. at the rate of 100° C./h and then natural cooling to room temperature, finally removing the heating device.

After local heat treatment, the residual stress measurement was conducted using X-ray method (iXRD Portable residual stress measuring instrument).

Measuring temperature difference at different distances from the weld during the constant temperature between the inner wall (12 o'clock position), the results are shown as follows

| | Error between average temperature zone (50 mm from weld edge) and inner weld (° C.) | | |
|---|---|---|---|
| Time | Outer wall #9 | Inner wall #17 | Temperature difference |
| 765° C.*1 h | 744 | 736 | 8 |
| 765° C.*2 h | 747 | 739 | 8 |
| 765° C.*3 h | 751 | 740 | 11 |
| 765° C.*4 h | 753 | 740 | 13 |
| 765° C.*5 h | 754 | 742 | 12 |
| 765° C.*6 h | 755 | 746 | 9 |
| 765° C.*7 h | 755 | 747 | 8 |
| 765° C.*8 h | 755 | 749 | 6 |

The residual stress before and after local heat treatment was measured and the results were shown as follows.

| | | Before LHT | | After LHT | |
|---|---|---|---|---|---|
| Location | No. | X (Axial) | Y (Circumferential) | X (Axial) | Y (Circumferential) |
| Base metal | 20 | 139 | 90 | 80 | 56 |
| | 19 | 165 | 173 | 97 | 96 |
| | 18 | 149 | 175 | 89 | 114 |
| | 17 | 129 | 177 | 72 | 112 |
| HAZ | 16 | 153 | 184 | 68 | 97 |
| | 15 | 165 | 137 | 99 | 95 |
| | 14 | 173 | 138 | 97 | 102 |
| Weld metal | 13 | 164 | 139 | 89 | 94 |
| | 12 | 142 | 143 | 100 | 90 |
| | 11 | 143 | 112 | 89 | 83 |
| | 10 | 149 | 119 | 97 | 80 |
| | 9 | 187 | 140 | 111 | 81 |
| | 8 | 142 | 134 | 84 | 74 |
| HAZ | 7 | 140 | 108 | 79 | 62 |
| | 6 | 139 | 101 | 87 | 74 |
| | 5 | 171 | 169 | 91 | 98 |
| Base Metal | 4 | 187 | 108 | 67 | 84 |
| | 3 | 182 | 153 | 79 | 97 |
| | 2 | 179 | 130 | 87 | 90 |
| | 1 | 169 | 117 | 91 | 77 |

The test results of the above embodiment shows that the local heat treatment method of the present invention can be widely applied in various diameters and wall thickness of steel pipe P92 conditions at the site of the local heat treatment after welding, and are able to effectively reduce the axial and circumferential directions residual stress, and can achieve effectively reduce the ASME Code P92 pipeline during PWHT temperature inside and outside wall temperature (less than 25° C.).

We claim:

1. A method for local heat treatment of a walled steel pipe following welding, comprising steps:
   (1) obtaining a heated band width, HB as a parameter for local heat treatment by carrying out the following calculation:

$$HB = 15.6 \times \sqrt{Rt} - 3.556 \times R - 372$$

where R in mm is the inner radius of the walled steel pipe and t in mm is the wall thickness of the walled steel pipe;
   (2) obtaining a gradient control band, GCB as another parameter for local heat treatment by carrying out the following calculation:

$$GCB = 1.4 \times HB + 226;$$

(3) performing a welding process on the walled steel pipe;
   (4) after welding, when the temperature of the walled steel pipe is cooled down to 120-150° C., setting up a heating device and an insulation device according to the HB and GCB values calculated in step 1 and, when the temperature of the walled steel pipe is further cooled down to 80-100° C., the heating device is turned on to maintain the temperature of the wall steel pipe at 80-100° C. for 2 hours;
   (5) heating the walled steel pipe, at a first heating rate of 150° C. per hour, to reach a temperature of 300° C. then further heating the walled steel pipe, at a second heating rate of 80° C. per hour to reach a temperature of 765° C. and maintaining the temperature at 765° C. for 4 hours or a duration based on the following calculation, whichever is longer, $$D = 5 \times t,$$

where D is duration in minute and t is the wall thickness in mm;
   (6) lowering the temperature to 300° C. at a cooling rate of 100° C. per hour and then turning off the heating device and letting the walled steel pipe naturally cool down to room temperature before removing the heating device and insulating device and completing the local heat treatment.

2. The method for local heat treatment of a walled steel pipe according to claim 1, wherein the heating device is a flexible ceramic resistive heater, which, together with a thermocouple and cotton insulation are used to control the first and second heating rates and the cooling rate.

3. The method for local heat treatment of a walled steel pipe according to claim 1, wherein a plurality of temperature zones are set on the walled steel pipe in and around the area subject to welding, each with a thermocouple for measuring the temperature during local heat treatment.

* * * * *